US 12,381,919 B1

(12) United States Patent
Hassan et al.

(10) Patent No.: US 12,381,919 B1
(45) Date of Patent: Aug. 5, 2025

(54) COMMUNICATION SESSION JOIN MODES AND AUTO JOIN

(71) Applicant: Microsoft Technology Licensing, LLC, Redmond, WA (US)

(72) Inventors: Amer Aref Hassan, Kirkland, WA (US); Mahendra D. Sekaran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/426,955

(22) Filed: Jan. 30, 2024

(51) Int. Cl.
*H04L 65/1093* (2022.01)
*H04L 12/18* (2006.01)
*H04L 65/80* (2022.01)

(52) U.S. Cl.
CPC ...... *H04L 65/1093* (2013.01); *H04L 12/1822* (2013.01); *H04L 65/80* (2013.01)

(58) Field of Classification Search
CPC .. H04L 65/1093; H04L 12/1822; H04L 65/80
See application file for complete search history.

(56) References Cited

U.S. PATENT DOCUMENTS

| | | | |
|---|---|---|---|
| 8,848,025 B2 * | 9/2014 | Talukder | H04L 65/403 348/E7.083 |
| 10,511,643 B2 | 12/2019 | Faulkner et al. | |
| 10,972,301 B2 | 4/2021 | Roedel | |
| 11,444,797 B2 | 9/2022 | Roedel | |
| 2006/0242232 A1 * | 10/2006 | Murillo | H04L 12/1813 709/204 |
| 2008/0235367 A1 * | 9/2008 | Niemeyer | H04L 67/54 709/224 |

(Continued)

FOREIGN PATENT DOCUMENTS

| | | |
|---|---|---|
| GB | 2598897 A | 3/2022 |
| WO | 2008139495 A2 | 11/2008 |

(Continued)

OTHER PUBLICATIONS

"Barge-Monitor-Whisper", Retrieved From: https://support.8x8.com/business-phone/voice/admin-console/work-group-settings/barge-monitor-whisper-groups/Barge-Monitor-Whisper_(BMW)_Dial_Codes, Jan. 20, 2022, 2 Pages.

(Continued)

*Primary Examiner* — Oanh Duong
(74) *Attorney, Agent, or Firm* — Schwegman Lundberg & Woessner, P.A.

(57) ABSTRACT

Methods, machine-readable mediums, devices, and systems for joining a participant to a meeting in a modified join mode. A join mode comprises one or more configurable operational parameters within an network-based communication service that specifies the manner in which a participant is integrated into a network-based real-time interactive communication session such as a network-based meeting. Specifically, the join mode encompasses various privacy and visibility options that can be applied when a participant enters the meeting. One such option includes a presence concealment feature that, when activated, hides the joining participant's presence from one participant, one or more specific participants, or all participants within the meeting.

20 Claims, 10 Drawing Sheets

(56) References Cited

U.S. PATENT DOCUMENTS

| | | | |
|---|---|---|---|
| 2009/0157414 A1* | 6/2009 | O'Sullivan | G06Q 10/1093 705/5 |
| 2010/0306676 A1* | 12/2010 | Srinivasaraghavan | ........................ G06Q 10/10 709/227 |
| 2014/0310352 A1* | 10/2014 | Bhan | H04L 65/403 709/204 |
| 2016/0269331 A1 | 9/2016 | Lee | |
| 2017/0109586 A1* | 4/2017 | Rana | G06V 20/52 |
| 2021/0021649 A1 | 1/2021 | Rathod | |
| 2022/0329452 A1 | 10/2022 | Roedel et al. | |
| 2022/0353306 A1 | 11/2022 | White et al. | |
| 2024/0372964 A1* | 11/2024 | Balaji | H04N 23/62 |
| 2024/0397161 A1* | 11/2024 | Kim | H04L 65/1094 |

FOREIGN PATENT DOCUMENTS

| | | | | |
|---|---|---|---|---|
| WO | WO-2012024205 A2 * | 2/2012 | ............ | G06Q 10/10 |
| WO | WO-2023000772 A1 * | 1/2023 | | |
| WO | 2023077228 A1 | 5/2023 | | |

OTHER PUBLICATIONS

"How to Utilize Listen, Whisper, Barge", Retrieved From: https://callharbor.com/2020/07/24/how-to-utilize-listen-whisper-barge/, Jul. 24, 2020, 6 Pages.

"Monitor Coach and Barge-in Interactions", Retrieved From: https://docs.genesys.com/Documentation/IW/latest/User/MonitorCoachAndBarge-inInteractions, Oct. 7, 2020, 18 Pages.

International Search Report and Written Opinion received for PCT Application No. PCT/US2024/060889, Mar. 19, 2025, 12 pages.

* cited by examiner

COMMUNICATION SESSION JOIN MODES AND AUTO JOIN

TECHNICAL FIELD

Embodiments pertain to network-based communication sessions. Some embodiments relate to automatically joining network-based communication sessions. Further embodiments relate to joining network-based communication sessions in a particular join mode. Still additional embodiments relate to automatically joining network-based communication sessions in a particular join mode.

BACKGROUND

A communication service provides network-based communications in which devices exchange information over a network. The service enables end participants to send and receive messages, data, media, and other content through various communication protocols and interfaces. The communication service comprises a server component that handles routing and delivery of communications; client applications on participant devices for accessing the service; and network infrastructure for transmission of data. Participants register accounts with the service, which generates a virtual identity they can use across supported apps and platforms to unify their communications. The communication service may provide functionality such as contacts management, content sharing (e.g., text, image, video, files), real-time messaging with presence indicators, group conversations, voice/video calling, notifications, search, moderation, network-based meetings, analytics, and the like. The communication service aims to enable seamless, multimedia communications between individuals and groups across a range of devices, operating systems and use case scenarios.

A unified communication service is a type of communication service that enables participants to access multiple communication mediums through a single platform or interface. Capabilities brought together under the unified system may include, but are not limited to, messaging (email, chat, SMS etc.), voice calling, video calling, conferencing, file sharing, presence, and availability status. The unified communication service provides a consistent set of features on the front-end that abstract the back-end complexities of managing different protocols, networks, devices and use cases. The unified model provides participants convenient access to all their communication needs within a single application. The single application provides the ability to transition between modalities like switching from chat to voice/video call, increased productivity through streamlined workflows, availability status that shows contacts' preferred communication medium, and enterprise-grade security and compliance when needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
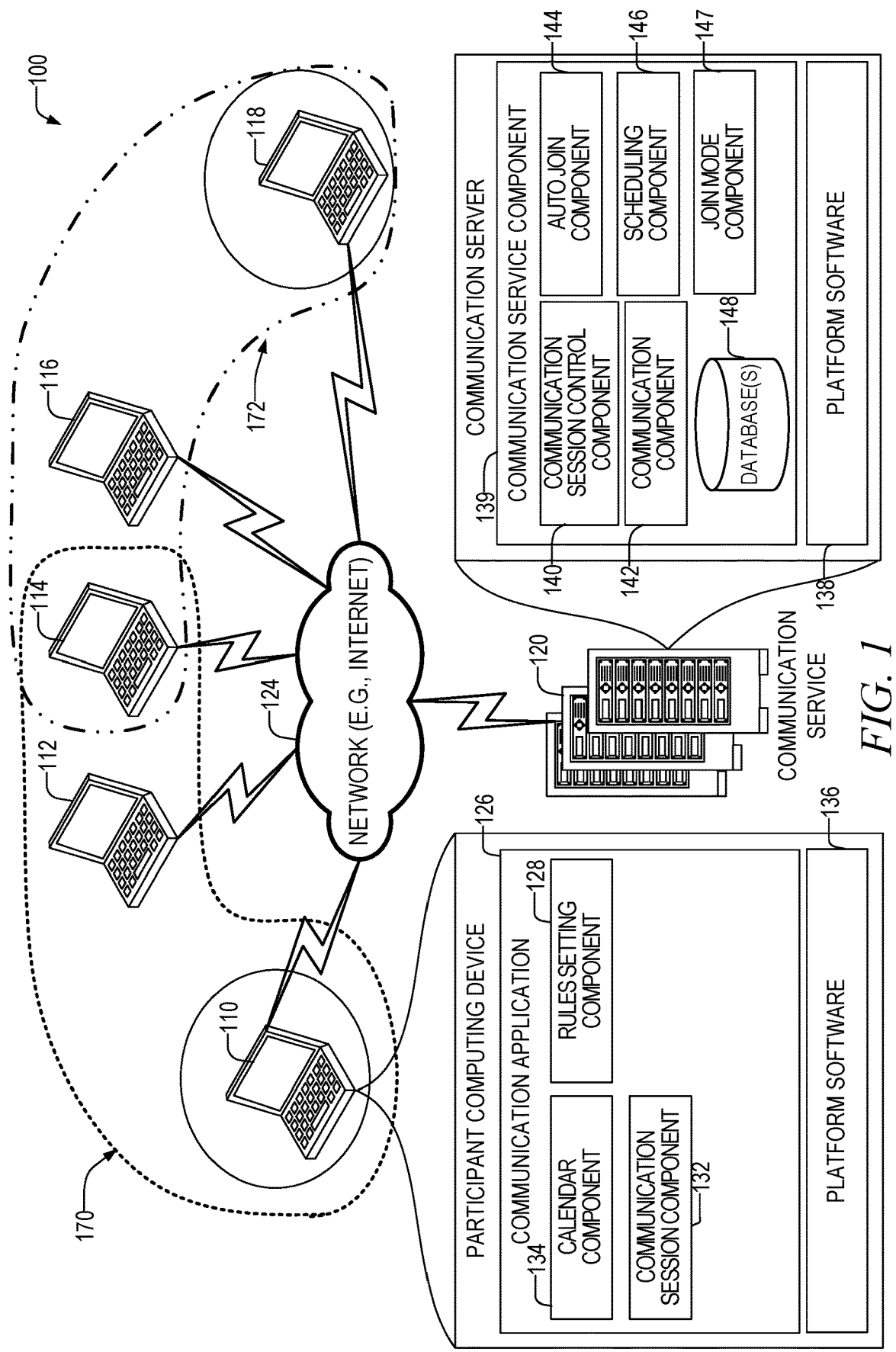
FIG. 1 illustrates a schematic of a communication system that provides for joining network-based meetings according to parameters of specified join modes and/or automatically joining meetings according to some examples of the present disclosure.

Network-based communication services allows participants to interact in real-time regardless of their physical location during one or more network-based communication sessions. Examples of network-based communications include voice communications, video communications, screen sharing, file sharing, and other data exchanges. One example of a network-based communication session includes a network-based real-time interactive communication session such as a network-based meeting. Network-based meetings allow participants to access the meeting space using instances of a client application executing on their devices. The client application handles real-time audio and/or video; presentation of content; chat messaging; screen sharing, and the like and connects to back-end servers at the communication service. The communication service, alone or in conjunction with the client applications of participants, manages one or more of: session initiation, routing, quality of service, security, meeting, media mixing, or the like. These network-based meetings have allowed participants to interact in a seamless fashion that is similar to, or in some aspects superior to, in-person meetings.

As network-based meetings grow in popularity, participants may be booked into many such network-based meetings throughout their day. The prevalence of such network-based meetings may not allow the participant to be as productive as they could be as such meetings may interfere with productive time. In order to facilitate increased productivity to participants of the network-based communication service, the present disclosure describes various improvements to the network-based communication service that allow the participant to selectively participate in the network-based meetings more easily.

First, for some of these network-based meetings, a participant may wish to be a limited participant. For example, the participant may wish to listen in on the meeting without actively participating—for example while multitasking on other work. In some examples, the participant may only wish to interact in certain limited ways. Current network-based conferencing solutions do not provide a way for a participant to join in such a limited way. While a first participant may mute themselves, the indication of the first participant as present in the meeting (e.g., by the display of their participant tile) may encourage other participants to involve the first participant, such as by questions or other communications.

Next, due to the prevalence of these meetings, a participant may wish to join only upon the happening of one or more predefined join conditions. For example, the participant may wish to join only after their supervisor or one or more of their colleagues join. While some systems may allow for prompting a participant that has not already joined to join based upon one or more conditions, such notifications may easily be missed by the participant. For example, the participant may be working diligently and miss the notification. Some time may pass before the participant notices the notification and joins the meeting. For these participants that wish to automatically join the meeting, they may also wish to join as a limited participant as the participant may not be prepared to participate in the meeting until a few moments pass after they are allowed to join. For example, the participant may need some time to gather their thoughts, open documents, position cameras, brush their hair, or the like.

Disclosed in some examples are methods, machine-readable mediums, devices, and systems for joining a participant to a meeting in a modified join mode. A join mode comprises one or more configurable operational parameters within an network-based communication service that specifies the manner in which a participant is integrated into a network-based real-time interactive communication session such as a network-based meeting. Specifically, the join mode encompasses various privacy and visibility options that can be applied when a participant enters the meeting. One such option includes a presence concealment feature that, when activated, hides the joining participant's presence from one participant, one or more specific participants, or all participants within the meeting. This feature ensures that the concealed participant can participate in the meeting by viewing and hearing other participants, and receiving the real-time media stream, while their own participant tile, including any visual representation, audio feed, or identifying information, is not displayed on the participant interface of the computing device of the participants from which the concealed participant is hidden. The join mode can be pre-selected by the meeting host or the participant themselves, depending on the permissions and settings available on the platform. In some examples, the join mode may be selected based upon a first set of one or more join mode rules based upon information in a meeting information model. The particular parameters of the join mode may be specified directly in the join mode rules, or the rules may select a join mode profile which includes the parameters. The modified join mode may allow the participant to monitor the meeting but not be forced to interact with other participants.

The Meeting Information Model (MIM) comprises both static and dynamic data elements related to the organization, execution, and management of a communication session. This model includes meeting metadata, which comprises pre-specified information such as the meeting's scheduled time, the title of the meeting, participant invitations (and their responses), access credentials, and a description of the meeting (including any provided content and agendas), a scheduled duration, and the like. The model also includes meeting status information, which captures live and ongoing data about the communication session such as participant attendance, engagement metrics, current discussion topics, content shared, a current presenter, and a record of items already addressed. The MIM serves as a foundational structure for meeting facilitation systems, providing a holistic view of all aspects of a meeting, from initial scheduling to real-time progression and historical archiving.

As noted, the join mode may prevent the participant from appearing as "present" to one or more other participants (either specific participants or groups of participants). For example, the participant is not shown to the one or more other participants in a list of attendees. In some examples, the join mode may specify that a subset of the participants may be able to see the presence of the participant and others may not be able to see the presence of the participant. In some examples, the subset of participants may be no participants—e.g., the participant is hidden from view from all participants.

The join mode may also specify communication rules that define rules for how other participants may communication with a particular participant. The join mode parameters may comprise communication rules which may take into consideration the visibility of the sender and recipient of the communication to each other. For example, the rules may specify that participants may chat with other participants that they are visible to, but not other participants. In other examples, the rules may specify that participants may still chat with other participants they are not visible to, but that such chat messages are anonymized.

Also disclosed in some examples are methods, machine-readable mediums, devices, and systems for joining a participant to a meeting automatically. For example, according to a set of automatic join rules, the system may determine to join the participant automatically, without participant intervention, to a communication session. The third set of one or more rules may utilize information from the MIM. In some examples, the system may both join the participant automatically and apply a modified join mode.

The present disclosure thus solves the technical problem of inefficient participant interactions in joining a meeting using the technical solution of joining the meeting automatically using a rule-based approach. The present disclosure also solves the technical problem of inefficient participant interactions in automatically joining the meeting using rule-selected based join modes that hide the automatically joined participant from other participants in order to allow the automatically joined participant to get up to speed on the meeting agenda. In addition, the participant may not wish to stay in the meeting. Thus, the present disclosure also provides the technical benefits of allowing participants to preview a meeting prior to joining fully. In prior art solutions, because a first participant is visible to other participants, the first participant may feel pressure to stay in the meeting—this wastes the first participant's time, wastes computing resources, network resources, and power. By allowing the first participant to leave the meeting before the first participant is noticed by others in the meeting, the first participant may more easily leave the meeting, conserving time and resources.

FIG. 1 illustrates a schematic 100 of a communication system that provides for joining network-based meetings according to parameters of specified join modes and/or automatically joining meetings according to some examples of the present disclosure. Participant computing devices 110, 112, 114, 116, and 118 are computing devices operated by participants of the communication session. Each participant computing device executes an instance of a communication application, such as communication application 126 which enables participation in the communication session. As used herein, an application instance refers to a particular launched copy of an application that has its own process, resources, and state. Multiple instances of the same application may run independently on a device and a same application may have different instances on different devices.

The communication application 126 may run in conjunction with platform software 136. Platform software 136 may include an operating system, device firmware, Unified Extensible Firmware (UEFI), and other software that provides communications with the hardware of the computing device, process management, memory management, device management, participant interfaces, networking, and security.

The communication application, such as communication application 126 may include a communication session component 132 which handles the client-side operations for joining, ending, and conducting the online meeting. For example, the communication session component 132 may provide client-side operations for session setup and signaling; providing a user interface; capturing audio and video from the participant's camera and microphone; encoding the audio and video; and transmitting the audio and/or video to other participants. Communication session component 132 may also receive the audio/video streams from other participants and decode and render them for presentation to the participant. Other functionality enabled by the communication session component 132 includes facilitating screen sharing or content presentation with other participants. The audio and/or video sent by the communication session component 132 may be sent to the communication session control component 140 of a communication service component 139 executing on communication server(s) 120 for distribution to other participants. In addition, the communication session component 132 may also receive shared content from other participants and render it to output devices such as a display (e.g., an attached, or an external display) or a speaker (such as an attached, or external speaker).

Additionally, the communication session component 132 provides an interactive participant interface (e.g., a GUI) for the participant to control the meeting and view and experience media. This can include features like muting/unmuting audio, starting/stopping video, screen sharing controls, chat messaging, raising hand, Q&A controls, etc.

The participant computing devices communicate with each other, e.g., via the communication service over a network 124, (e.g., the Internet or other network). The communication service may be hosted on one or more computer servers, such as communication server(s) 120. The communication service includes a communication service component 139. Communication service component 139 includes a communication session control component 140 which facilitates server-side operations for establishment and management of the online meeting. For example, it handles participant authorization and authentication for a participant when logging into the communication service and/or joining the meeting. It also takes the media streams from each client and distributes them to other participants. This may include mixing audio and/or video sources, creating composite video layouts, and broadcasting shared content. The communication session control component 140 may also provide session management functions like starting the session; tracking connected participants; enforcing meeting policies; recording the session; generating analytics; ending the session; reserving and freeing server and network resources used in the session; and the like. Scheduling component 146 of the communication service component 139 may work with a communication application, such as communication application 126 to schedule and reserve network-based communication sessions. For example, the scheduling component 146 may send one or more reservations, receive responses, and maintain statuses of participants. Scheduling component 146 may work with the calendar component 134 of communication applications of participants.

Platform software 138 may execute on the communication server(s) 120 and may include an operating system, device firmware, Unified Extensible Firmware (UEFI), and other software that provides for communications with the hardware of the computing device, provide process management, memory management, device management, participant interfaces, networking, and security. Platform software 138 may be the same as platform software 136 or may be different.

In addition to the above functions, the communication application 126 on the participant computing device 110 may include a calendar component 134 that integrates with native device calendars like Outlook, Google Calendar, or Apple Calendar for calendar data syncing. The calendar component 134 parses communication session invite data, including organizer, attendees, start/end times, location, meeting description, and attachments. The calendar component 134 displays a visual notification of the invite and meeting details. The participant can choose to accept, tentatively accept, decline, or propose a new time. Acceptance information is communicated to meeting organizers by updating attendance status such as through a calendar server protocol. Relevant meeting event data like title, description, participants list, and timing information may be stored locally, e.g., in a participant's calendar, for reference by other components. Calendar component 134 may remind a participant prior (e.g., 15 minutes or another configurable time) to, or after the start of the meeting to join the meeting. In some examples, calendar component 134 may present a notification to a participant along with a selectable control allowing the participant to join the session.

The communication application 126 may include a rules setting component 128 which may provide one or more UIs that allow participants to create, edit, and delete auto join rules and join mode rules, including communication rules that specify how other participants can interact with the participant. Rules may be set on a per-participant basis. That is, the rules are specific to each participant. In other examples, the rules may be meeting specific. That is, the rules may be only for a particular meeting. In still other examples, rules may be set by an organization that the participant belongs to. In still additional examples, the rules may be specified by an organizer of the meeting for one or more participants. Rules set by the rules setting component 128 may be sent to the communication service component 139 where they may be stored in the database 148.

Communication service component 139 may include an auto-join component 144 which evaluates, during the network-based meeting, the auto join rules stored in the database for each particular invitee of a particular communication session that has not yet joined the communication session. Rules may be evaluated using data from the MIM, and the like. If the evaluation of the rules results in an indication that the participant should be joined, the auto-join component 144 may send a message to an instance of the communication application 126 executing on the participant computing device of the participant that is to be auto-joined. The communication session component 132 of that instance may then automatically join the participant to the meeting.

Join mode component 147 may evaluate for a particular participant (either an auto-joined participant or for a participant that joined manually) the join mode rules to determine a join mode for the participant. In some examples, the join modes specify visibility of a participant to another participant. In case that a participant is not visible to another participant, this information may be passed to the communication session control component 140 to cause the communication session control component 140 to remove or not include the participant tile of a first participant that is not visible to the second participant in a GUI of the second participant. In other examples, the communication session control component 140 may anonymize the participant tile of the first participant in the GUI of the second participant. In addition, the communication session control component 140 may prevent audio and/or video of the first participant from being sent to the second participant. In addition, the meeting roster describing the participants of the communication session sent to the second participant may omit the first participant so that the second participant is not aware of the presence of the first participant. In some examples, the second participant is aware of the presence of the first participant but is not made aware of an identity of the first participant. Instead, the first participant's identity, and/or audio and video are anonymized (e.g., obfuscated by blurring, voice changes, and the like).

Communication component 142 may receive one or more communications from one or more participants. The received communications may be screened to determine whether the communication complies with one or more of the communication rules from the join mode of the sender and/or recipient. In some examples, whether the communication is allowed may depend on the visibility of the sender to the recipient and vice versa, whether the sender or receiver automatically joined or joined manually, the type of communication, the content of the communication, or the like.

As a result of the communication rules, some communications may be entirely prohibited to some recipients from some senders. This may create one or more virtual communication groups; that is, sets of two or more participants that can communication with each other. The communication groups may be a subset of less than all the participants in a communication session. For example, FIG. 1 illustrates two communication groups 170 and 172. Communication group 170 is formed from communication rules corresponding to a participant utilizing participant computing device 110 that allows communication only to participants utilizing participant computing devices 112 and 114 and not to participants corresponding to participant computing devices 116 and 118. The communication groups may allow a participant to specify one or more groups in the communication service GUI as a destination for a particular communication e.g., a chat message, voice and video data, and the like.

In addition, the communication rules may specify allowable forms of communication between participant 110 and participants 112 and 114. In some examples, the forms of communications between participant 110 and participants 112 and 114 may be the same, but in some examples, some forms of communication may be allowed between participant 110 and 112 but not allowed between participant 110 and participant 114. In some examples, some forms of communication may be allowed originating from participant 110 and to participant 112 and/or 114 but not from participant 112 and/or 114 to participant 110. That is, the rules may permit that the participant 110 send some forms of communication but not receive those same forms, or vice versa. Thus, the communication rules may specify rules for sending, receiving, or both sending and receiving.

While FIG. 1 illustrated an example in which the communication service component 139 determined whether to auto-join a participant and what join mode the participant is to use, in other examples, the communication application 126 may also perform one or more of those functions.

Figure 2:
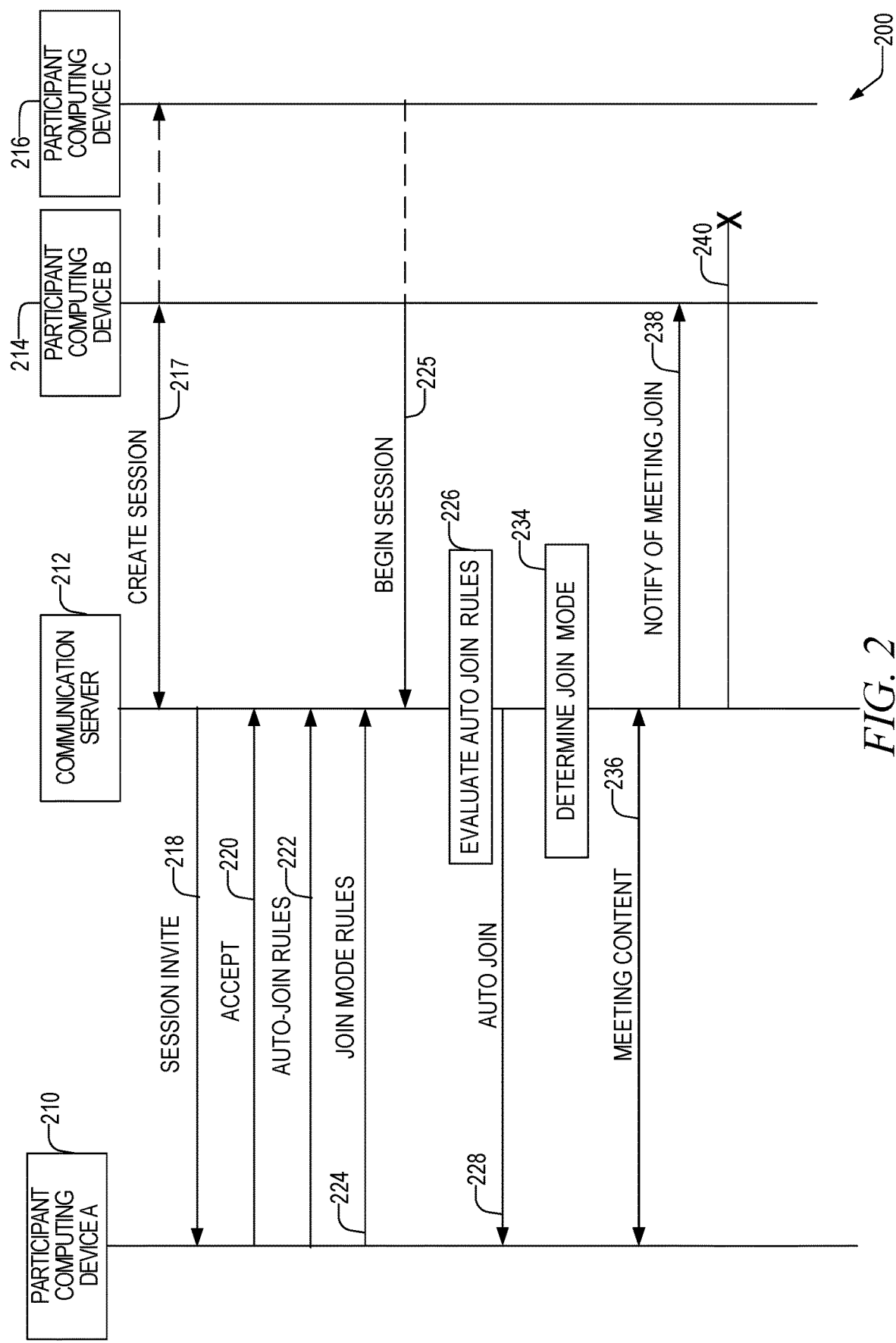
FIG. 2 illustrates a message sequence diagram (MSD) of a network-based communication session, such as a network-based real-time interactive communication session according to some examples of the present disclosure.

FIG. 2 illustrates a message sequence diagram (MSD) 200 of a network-based communication session, such as a network-based real-time interactive communication session according to some examples of the present disclosure. The MSD 200 begins with either the participant computing device B 214 or participant computing device C 216 creating a network-based communication session (e.g., a network-based meeting) by utilizing one or more creation request messages 217 (e.g., using one or more messages) with the communication server 212. The communication server 212 may then send communication session invite messages, such as communication session invite 218 to the participants identified in the creation request messages 217. The participant computing device A 210 may accept the invitation using one or more accept messages 220. The acceptance may be signaled to and/or may change one or more data structures within, the participant computing device A 210, communication server 212, participant computing device B 214, and/or participant computing device C 216 to indicate that participant computing device A 210 has accepted. In some examples, the creation of the session and acceptance of the invitation, and/or the invitation itself may trigger one or more reminders, calendar entries, or the like on participant computing device A 210 and/or other participant computing devices, such as participant computing device B 214, and participant computing device C 216.

In some examples, the participant computing device A 210 may setup auto-join rules 222. The auto-join rules 222 may be global rules that are applicable to all meetings with the communication server 212. In other examples, the auto-join rules 222 may be specific to a particular communication session (e.g., as specified in the auto-join rules). The auto join rules may utilize MIM data, and the like to determine whether the participant is to join the meeting. The auto-join rules may be in the form of if-then-else rules and may be structured into complex dependencies such as a decision tree. In some examples, the auto-join rules 222 may be provided in response to the acceptance of a communication session, but in other examples, the auto-join rules 222 may be provided at a different time. In some examples the autojoin rules may be provided by the organizer of the meeting and/or an administrator.

The participant computing device A 210 may also send join mode rules 224 to the communication server 212. The join mode rules 224 may be specific to a particular communication session (e.g., as specified in the join mode rules) or applicable to all communication sessions through the communication server 212. The join mode rules may utilize MIM data, and the like to determine whether the participant will join the meeting in a modified join mode. The join mode rules may be in the form of if-then-else rules and may be structured into complex dependencies such as a decision tree. In some examples, the join mode rules 224 may be provided in response to the acceptance of a communication session, but in other examples, the join mode rules 224 may be provided at a different time. The join mode rules may be specified by the participant or may be specified by an administrator and/or an organizer of the meeting.

In some examples, the join mode rules may directly specify the join mode parameters. For example a join mode rule may be "if the participant is joined automatically, hide the participant's presence from all participants"—where the join type is part of the MIM and if the if-then statement evaluates to true, the parameters that the participant is hidden is applied. In other examples, the rules may select different join mode profiles which then specify the parameters. For example, a join mode rule may be "if the participant is joined automatically, then use join mode profile B" where join mode profile B may be a data structure that specifies that the participant is to be hidden from all other participants.

In addition to the MIM, the join mode rules may use other factors, such as the participants current activities as evidenced by what the participant is doing on the participant computing device. For example, if the participant is surfing the Internet just before, or just after a communication session starts, the system may apply different join mode rules than if the participant is actively working on business documents. The join mode parameters may specify how the participant is to join a communication session, such as whether the participant is visible to any other participants, and if the participant is visible to other participants, which participants. Participants may be identified specifically (e.g., by name) or may be identified by properties of the participant such as whether the participant is related to the participant (and what the relationship is) in an organization chart.

In some examples, the join mode rules may consider whether the participant was joined automatically as opposed to whether the participant manually joined the meeting through activation of one or more GUI controls. For example, if the participant is manually joining, the system may join the participant as normal-visible to all other participants. On the other hand if the participant is automatically joined to the meeting, the system may join the participant in a mode that makes the participant invisible to one or more other participants. This may allow the participant to finish up their tasks and prepare for the meeting.

The join mode rules may also specify one or more rules that modify the join mode upon the occurrence of events in the communication session. That is, the rules may be continually evaluated throughout the network-based meeting or other communication session. For example, a time threshold whereby after a certain amount of elapsed time where the participant is invisible in the meeting, the participant becomes visible to one or more other participants. In other examples, other events may be used to modify the join mode such as other participants joining, content being discussed, or the like.

In some examples, various communication session specific or administrator defined rules may prevent joining a session in a mode that is hidden to one or more participants. That is, a participant may be forbidden to join a session in a way that is invisible to certain participants (e.g., an organizer), or all participants. In other examples, only those participants directly invited may join in a join mode that hides their presence. This may exclude others that received their invitations forwarded from those that were directly invited. These rules may be used for enhanced security.

At some point before, at, or after the scheduled time for the communication session, the participant computing device B 214 and/or the participant computing device C 216 begins the communication session using one or more messages 225. At operation 226, in response to the session beginning, the communication server 212 may evaluate the auto join rules to determine whether to automatically join a participant, such as participant computing device A 210 to the communication session. As noted above, the communication server 212 may continually evaluate the auto join rules to determine whether to join the participant. In FIG. 2, the auto-join rules indicate that participant computing device A 210 is to be joined to the communication session. In response, one or more messages 228 are transmitted between the participant computing device A 210 and the communication server 212 to automatically join the participant computing device A 210 to the communication session.

At operation 234, the communication server 212 may determine a join mode based upon join mode rules. As noted, the join mode rules may be evaluated using MIM data, participant activity data, and the like to determine the join mode under which the participant is joining the meeting. After determining the join mode at operation 234, the communication server may apply the join mode. The join mode rules may be continually evaluated to determine whether a change in the join mode is indicated by the rules.

As a result of the joining the meeting (either manually or automatically), meeting content 236 is sent by the communication server 212 to the participant computing device A 210. Meeting content may include audio, video, screen sharing data, and in some examples, and depending on the join mode, the participant computing device A 210 may send meeting content that may be shared with one or more other participants.

As a result of the join mode, in some examples, some participants may not be aware of the presence of the participant computing device A 210. In the example of FIG. 2, participant computing device B 214 is made aware of the presence of participant computing device A 210 but participant computing device C 216 is not made aware of the presence of participant computing device A 210. This is reflected by the notification of meeting join 238 being sent to participant computing device B 214 but not participant computing device C. The notification of meeting join 240 is not sent to participant computing device C 216 as shown in the figure by the X interrupting the message. As previously noted, hiding a first participant from a second participant may also include removing, not creating, suppressing, or otherwise preventing a participant tile of the first participant from being displayed on a session GUI of the second participant. In addition, hiding the first participant from the second participant may also include not sending audio and/or video of the first participant to the second participant.

As also noted, the communications exchanged between participants, whether joined automatically or manually and whether in a modified join mode or a standard join mode may be modified using one or more communication rules that are part of the parameters of the join mode. For example, while a participant is hidden from one or more other participants, the hidden participant may be prevented from communicating with other participants that the participant is hidden from. Communications within the network-based communication session comprise chat messages, audio, video, screen sharing, file sharing, and the like.

Figure 3:
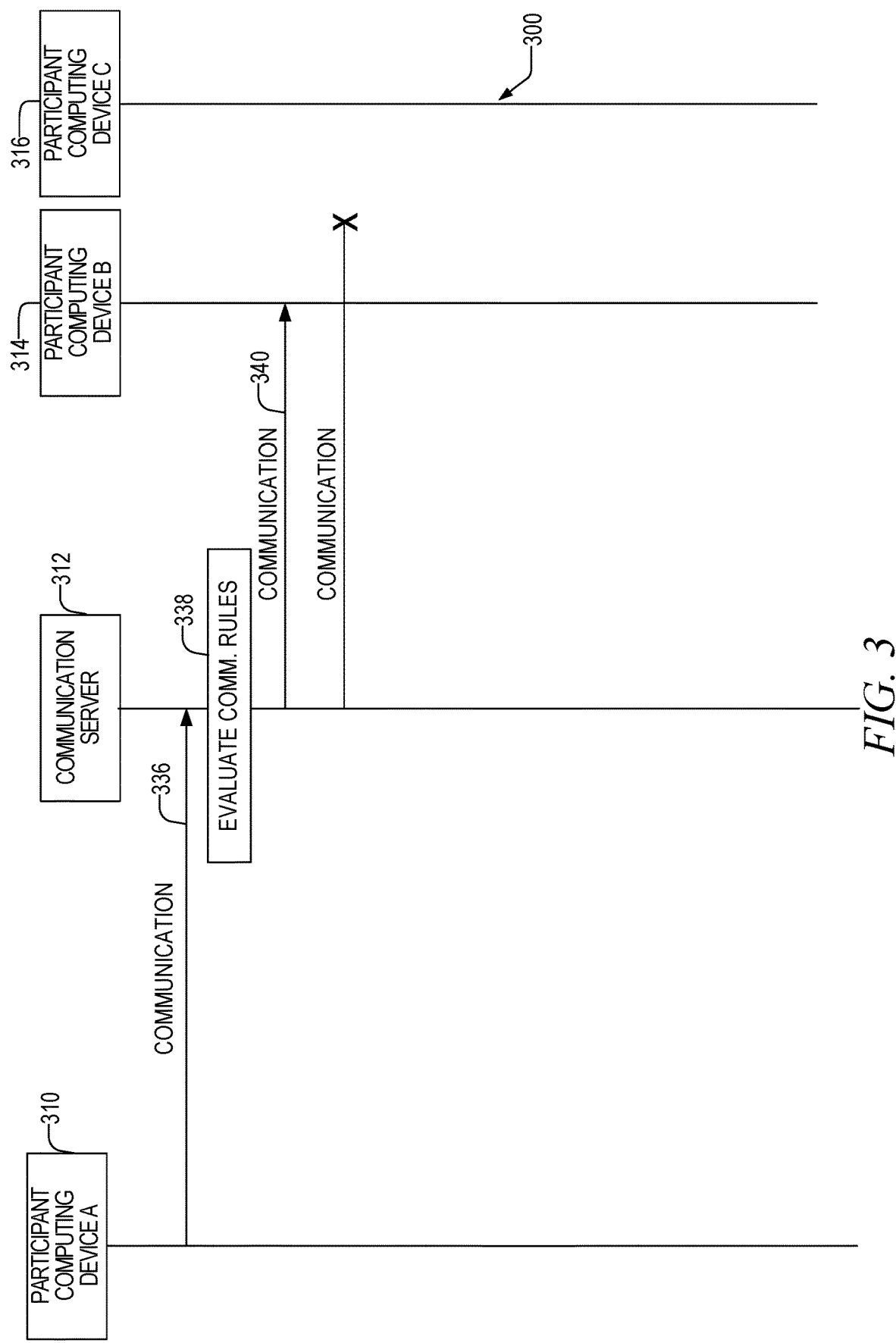
FIG. 3 illustrates a MSD of communication handling according to some examples of the present disclosure.

FIG. 3 illustrates a MSD 300 of communication handling according to some examples of the present disclosure. The MSD 300 occurs after a communication session is joined and a join mode is determined. A communication 336 is received by the communication server 312 from the participant computing device A 310 and is addressed to participant computing device B 314 and participant computing device C 316. The communication server 312 evaluates the communication with communication rules of the participant computing device A 310, participant computing device B 314 and participant computing device C 316 at operation 338. The rules may be evaluated based upon the join type (automatically joined vs manually joined), the current join mode of the participant computing device A 310, the type of communication, a content of the communication, the sender participant, the recipient participant, data in the MIM, and the like to determine whether the communication is allowed.

In FIG. 3, the communication is determined to be allowed to the participant computing device B 314, but not to the participant computing device C 316. This may be because the communication rules of participant computing device A 310 did not allow this type of communication to participant computing device C 316, or that the communication rules of participant computing device C 316 does not allow this type of communication from participant computing device A 310. Thus, the communication 336 is forwarded using message 340 to the participant computing device B 314. The communication 336 is not forwarded to the participant computing device C 316 as shown by a message with an X indicating that the message is not sent.

Figure 4:
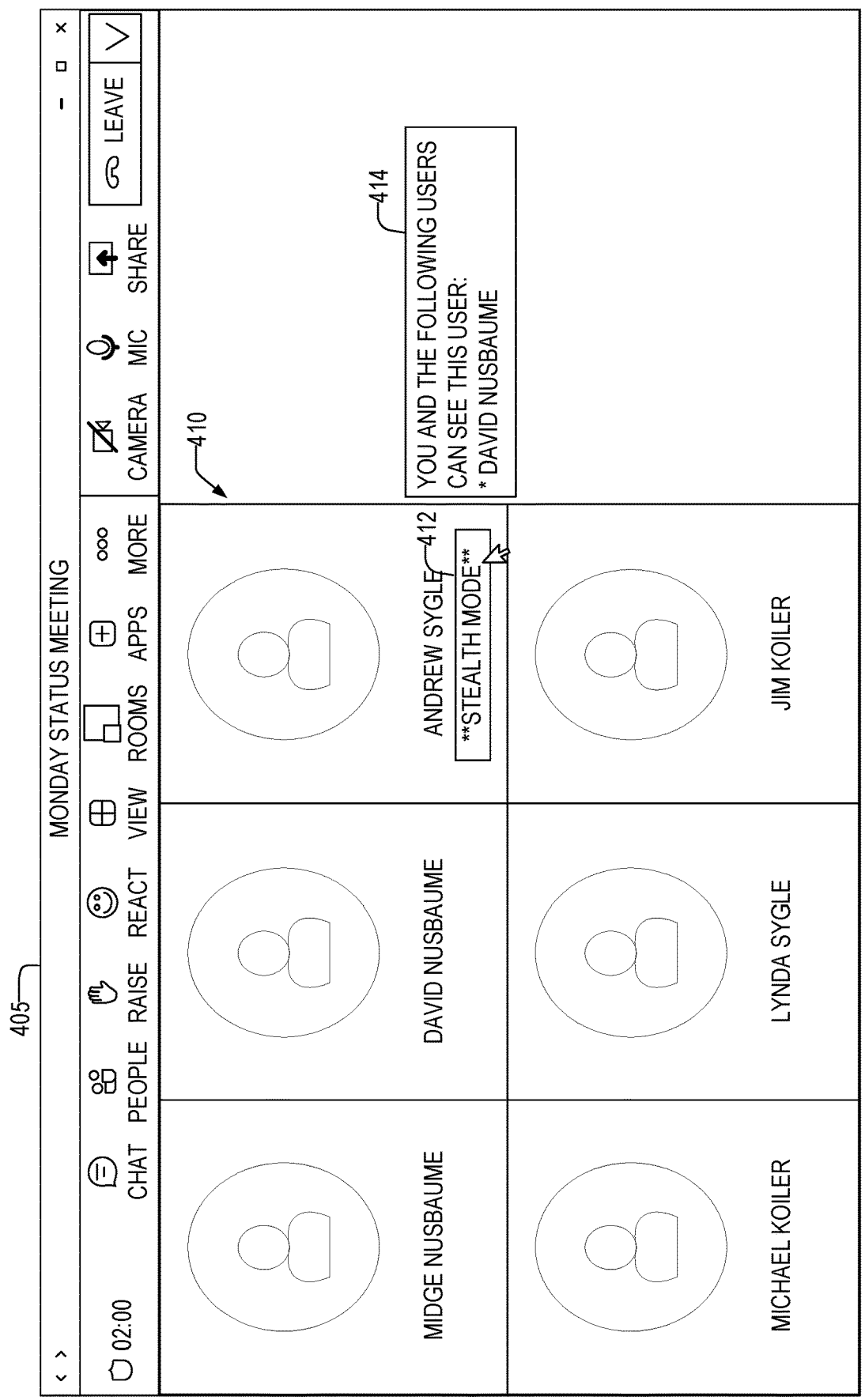
FIG. 4 illustrates a Graphical User Interface (GUI) of a communication session with a participant joined using a modified join mode according to some examples of the disclosure.

FIG. 4 illustrates a Graphical User Interface (GUI) 405 of a communication session with a participant joined using a modified join mode according to some examples of the disclosure. The GUI 405 is presented to a second participant that, according to the join mode of a first participant, Andrew Sygle, can view the presence of the first participant. The GUI presents an arrangement of participant tiles 410. A 'participant tile' is a graphical user interface element within a network-based real-time interactive communication session that visually represents an individual participant. It typically includes a video feed of the participant when their camera is active or an avatar or placeholder image when the video is off. The tile may also display the participant's name, status indicators such as mute or hand-raised, and other interactive controls pertinent to the session. The design of the participant tile facilitates the organization and management of multiple participants by providing a consistent and individual space for each participant within the digital meeting environment. The participant tile can dynamically change in response to participant interactions or session events, such as enlarging when a participant speaks (e.g., a speaker stage mode) or being hidden from view when the participant's presence is to be concealed from others. The GUI also presents an indication 412 next to the participant tile of Andrew Sygle that Andrew is in "stealth mode"—that is, Andrew is hidden from one or more other participants. In some examples, by hovering over the indication 412, a box 414 shows which participants can see Andrew Sygle. In this case, the current participant and David Nusbaume can see the presence of Andrew Sygle in the meeting.

Figure 5:
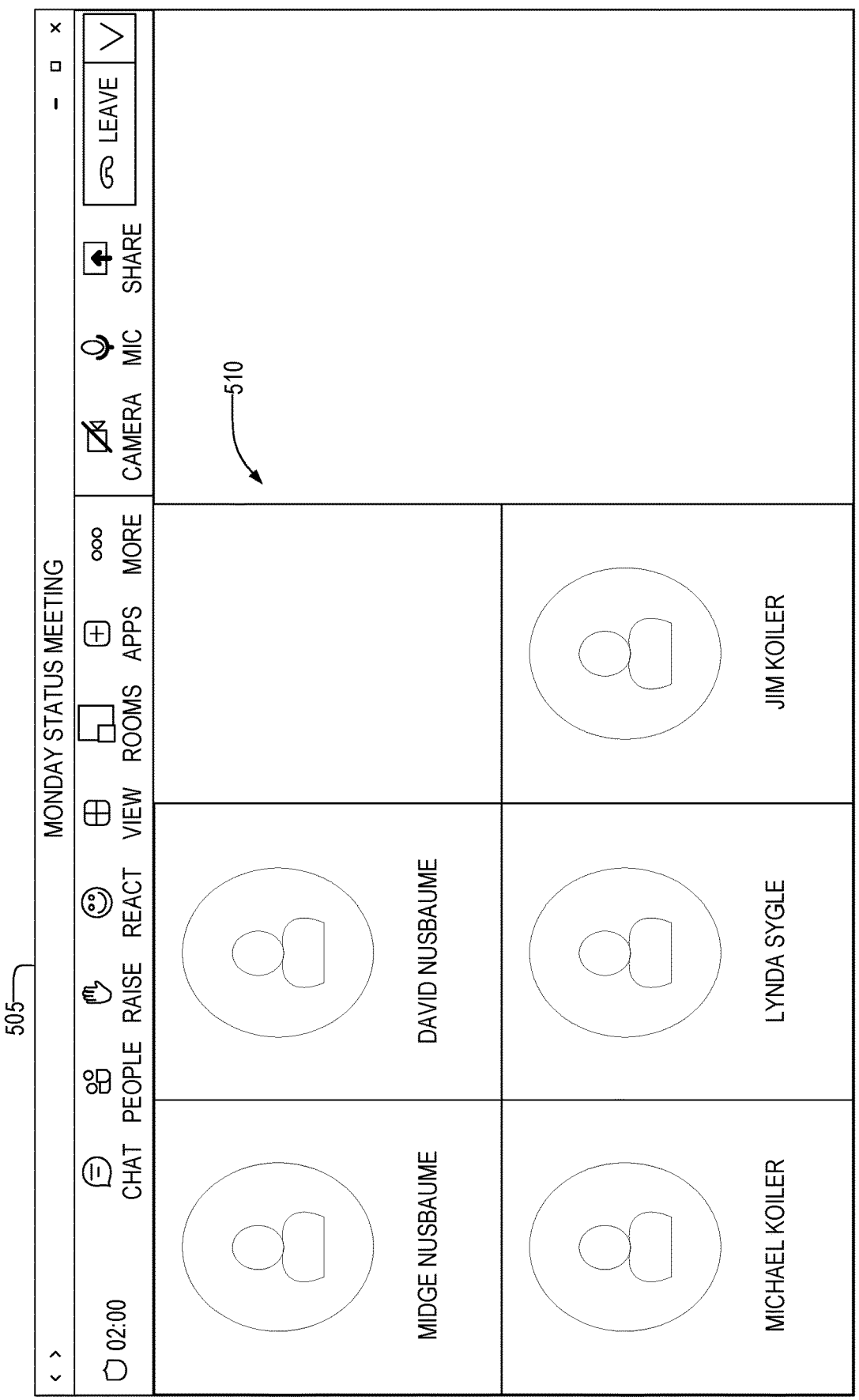
FIG. 5 illustrates a Graphical User Interface (GUI) of a communication session with a participant joined using a modified join mode according to some examples of the disclosure.

FIG. 5 illustrates a Graphical User Interface (GUI) 505 of a communication session with a participant joined using a modified join mode according to some examples of the disclosure. The GUI 505 is of a same communication session of GUI 405, but is a GUI presented to a participant that, according to the join mode of another participant, Andrew Sygle, can not view the presence of Andrew Sygle. The participant tile for Andrew Sygle is precluded from display in GUI 505 where other participant tiles 510 are displayed. In other examples, the participant tile of Andrew Sygle may be anonymized. For example, by using a different name (e.g., "anonymous participant") and precluding display of Andrew's video. In some examples, Andrew's video may show up for other participants that Andrew designates according to the prescribed join mode.

Figure 6:
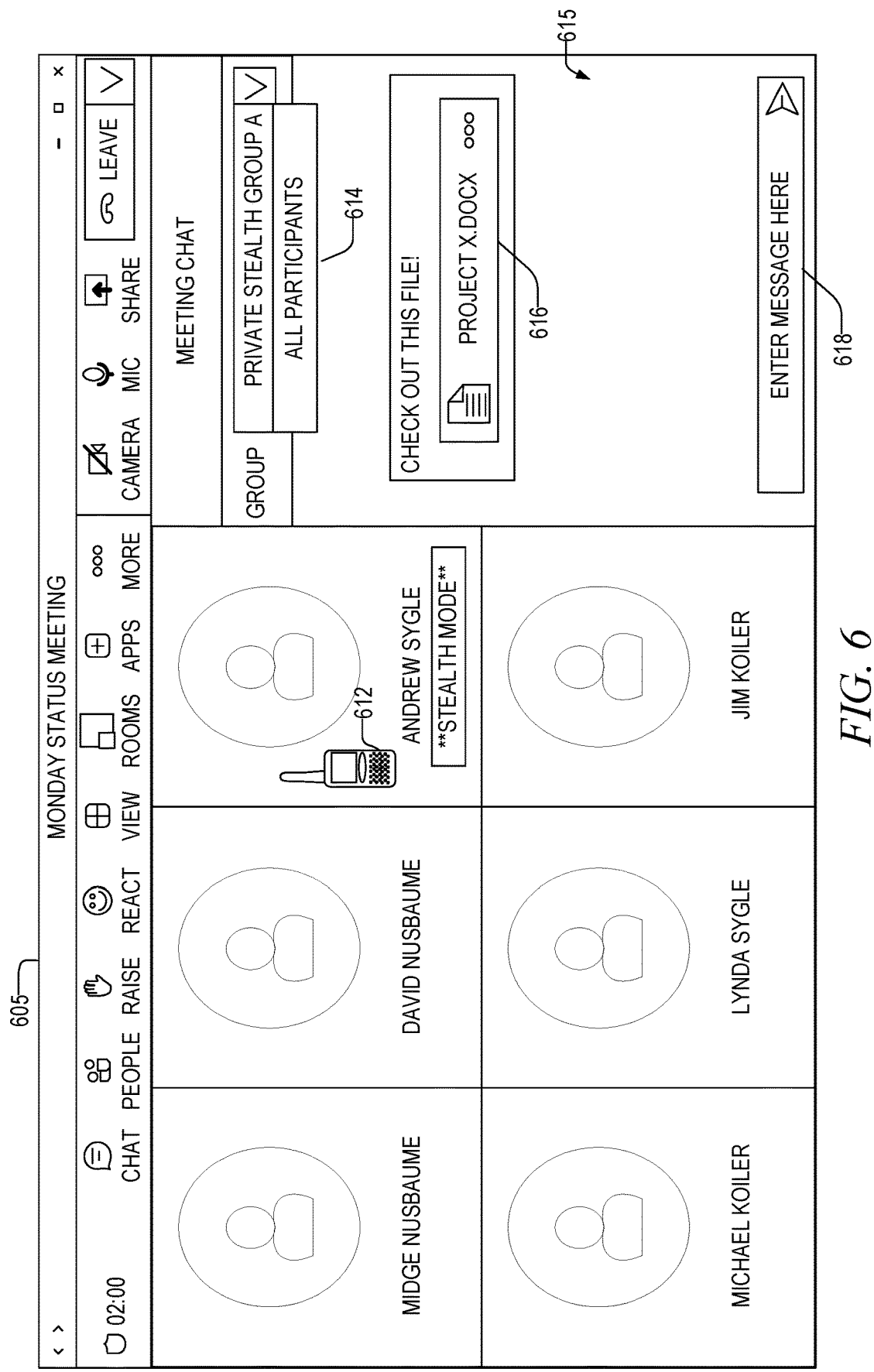
FIG. 6 illustrates a Graphical User Interface (GUI) of a communication session with a participant joined using a modified join mode according to some examples of the disclosure.

FIG. 6 illustrates a Graphical User Interface (GUI) 605 of a communication session with a participant joined using a modified join mode according to some examples of the disclosure. The GUI 605 is presented to a participant that, according to the join mode of participant Andrew Sygle, can view the presence of Andrew Sygle. In the GUI 605, a meeting chat is opened. A dropdown box 614 is used to select a chat group formed by the join mode rules. Each chat group may have a different chat page showing chat messages for the group and allowing participants to enter chat messages to be sent to the group using new message control 618.

As shown in FIG. 6, there are two pages, an all-participants page which is used to send communications to all participants and to view messages from participants that were posted to the all participants page except those communications posted by a participant that is hidden from a particular participant. A second chat page is for a private stealth group A which comprises the group of participants that can see stealth mode participant Andrew Sygle. As previously described, chat groups may be formed based upon visibilities created by the join modes. These chat groups may be named and/or renamed by participants. Each chat page shows chats associated with the chat group. For example chat page 615 shows messages associated with the private stealth group A chat group, which is a single message 616. The all-participants page may feature chat messages from all participants and in some examples, posts made to that group by Andrew Sygle may only appear to those participants for whom Andrew Sygle is visible. In other examples, posts by Andrew Sygle may not be allowed in the all-participants page. In still other examples, posts by Andrew Sygle may be anonymized.

In addition to chats, the communication rules of Andrew Sygle and/or the communication session allows for private voice communications with Andrew. In some examples icon 612 allows participants to "push-to-talk" to Andrew. That is, participants may press or click on the icon and speak only to Andrew, or to the group of participants visible to Andrew, but not the entire communication session. Once the button is released or another indication is given, voice communications are now directed to the entire communication session. In some examples, voice communications and/or video of Andrew Sygle may be presented to participants that can see the presence of Andrew Sygle. In other examples, voice and/or video of Andrew Sygle may not be allowed.

Figure 7:
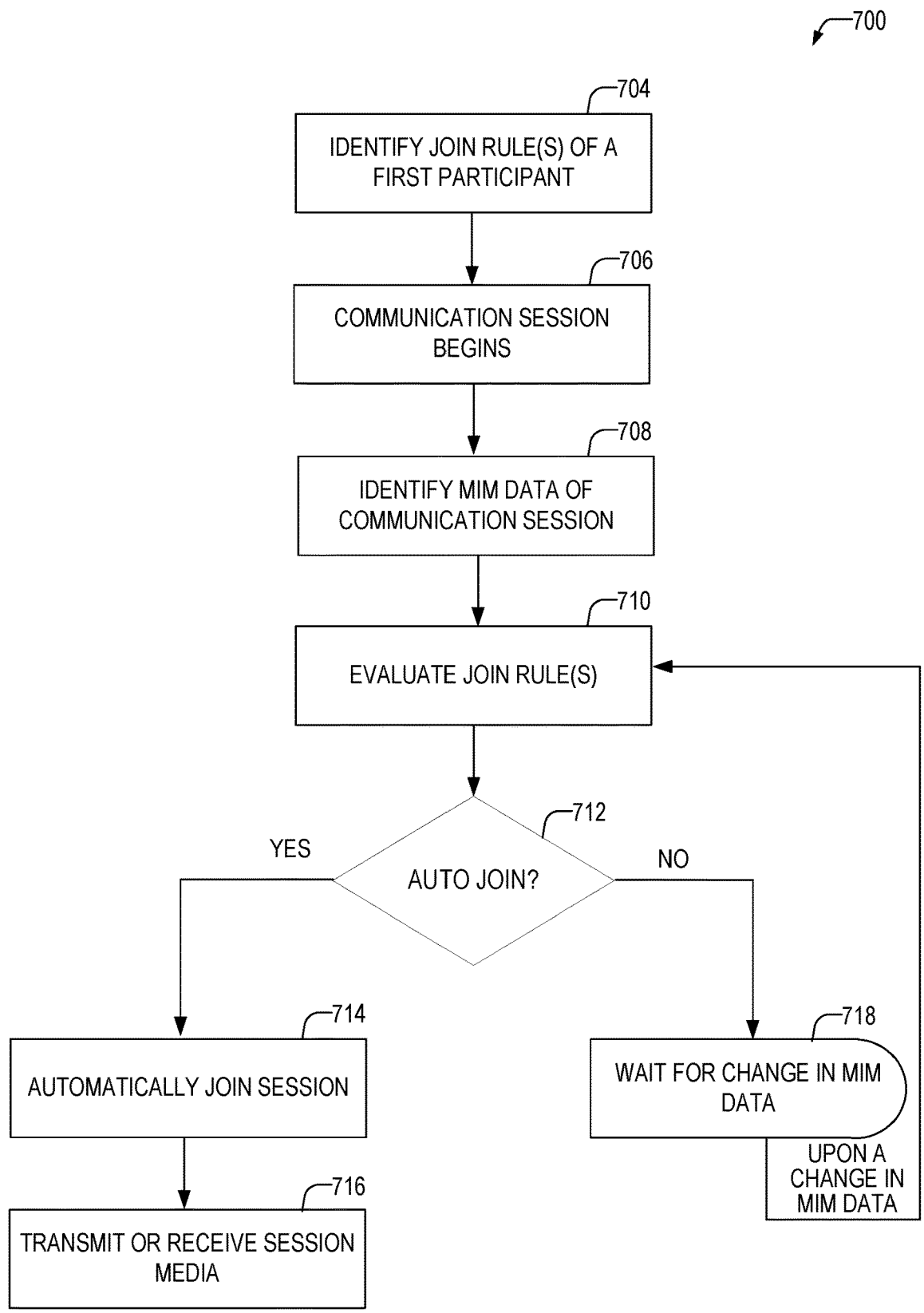
FIG. 7 illustrates a flowchart of a method for automatically joining a communication session in accordance with one or more join rules according to some examples of the present disclosure.

FIG. 7 illustrates a flowchart of a method for automatically joining a communication session in accordance with one or more join rules according to some examples of the present disclosure. FIG. 7 may be performed at a server of the communication service, at a participant's computing device, or partially at the server of the communication service and partially at the participant's computing device. At operation 704, the device may identify one or more join rules of a first participant in the communication session. A participant of the communication session is a participant of the communication service that is invited to the communication session. The join rules may be specified by the participant—e.g., through one or more GUIs or programmatically through an Application Programming Interface (API). In some examples the join rules may be specified by a communication service administrator. In other examples, the join rules may be specified by the meeting organizer. For example, the meeting organizer may specify that a particular participant to be joined when one or more other conditions exist. For example, if the meeting discusses a particular topic, the participant is automatically joined. This use case may be desirable in that the participant's time may be reserved (e.g., by virtue of the participant accepting the invitation to the communication session-thereby "booking" the time in their calendar); but they are only added to the communication session if needed. This saves computing resources (e.g., network bandwidth and processing of the communication service), while also saving the time of the participant and keeping the communication session participant list down to only the necessary participants. In still other examples, the join rules may be specified by one or more of the participant, administrator, and/or the meeting organizer. For example, some join rules may be specified by the participant, some by the administrator, and some by the meeting organizer.

At operation 706, the communication session begins. For example, the communication session may be for a scheduled time and the current time matches the time the session is to begin. In other examples, one or more participants has started the meeting (e.g., the meeting may start early or late).

At operation 708 the device may identify MIM data such as meeting metadata and/or meeting event data of the communication session that corresponds to the identified join rules. Example meeting metadata include the title of the meeting, the invited participants, the responses of the invited participants (e.g., accept, tentative, decline), a description of the meeting (including any provided content and agendas), a time of the meeting, a duration of the meeting, and the like. Example meeting event data may include data and events that happen during the meeting such as topics discussed, content shared, participants that have joined, participants that have not joined, an elapsed duration of the meeting, a current presenter, and the like. If method 700 is performed by the participant's computing device, the participant's computing device and/or the communication service may communicate to obtain the MIM data. Metadata and/or meeting event data corresponds to the identified join rules if the metadata and/or meeting event data is needed to evaluate one or more identified join rules.

At operation 710, the device may evaluate the join rules using the metadata and/or the event data to determine whether the join rules indicate that the participant is to be automatically joined. Based upon the evaluation of the join rules at operation 710, the device determines, at operation 712, whether the participant is to be automatically joined. If the participant is to be automatically joined, then at operation 714, the participant may be joined automatically without participant intervention (e.g., without the participant having to click on a "join" button or otherwise consent to joining the meeting). If method 700 is performed by the participant's computing device, the participant's computing device may send a join message to the communication service. If the method is performed at a server of the communication service, then the communication service sends a message to the client's computing device. At operation 716, the communication service begins to send, and the participant's computing device begins to receive media from the communication session. Example media includes audio, video, screen sharing data, and the like.

If the rule evaluation at operation 710 does not indicate that the participant should be automatically joined to the communication session, then at operation 718, the device may wait for a change in MIM data such as a change in event data and/or communication session metadata. If a change is received or identified, then operations 710 and 712 are repeated using the changed event data. In this way, the system may monitor for changes that results in the participant being automatically added.

Figure 8:
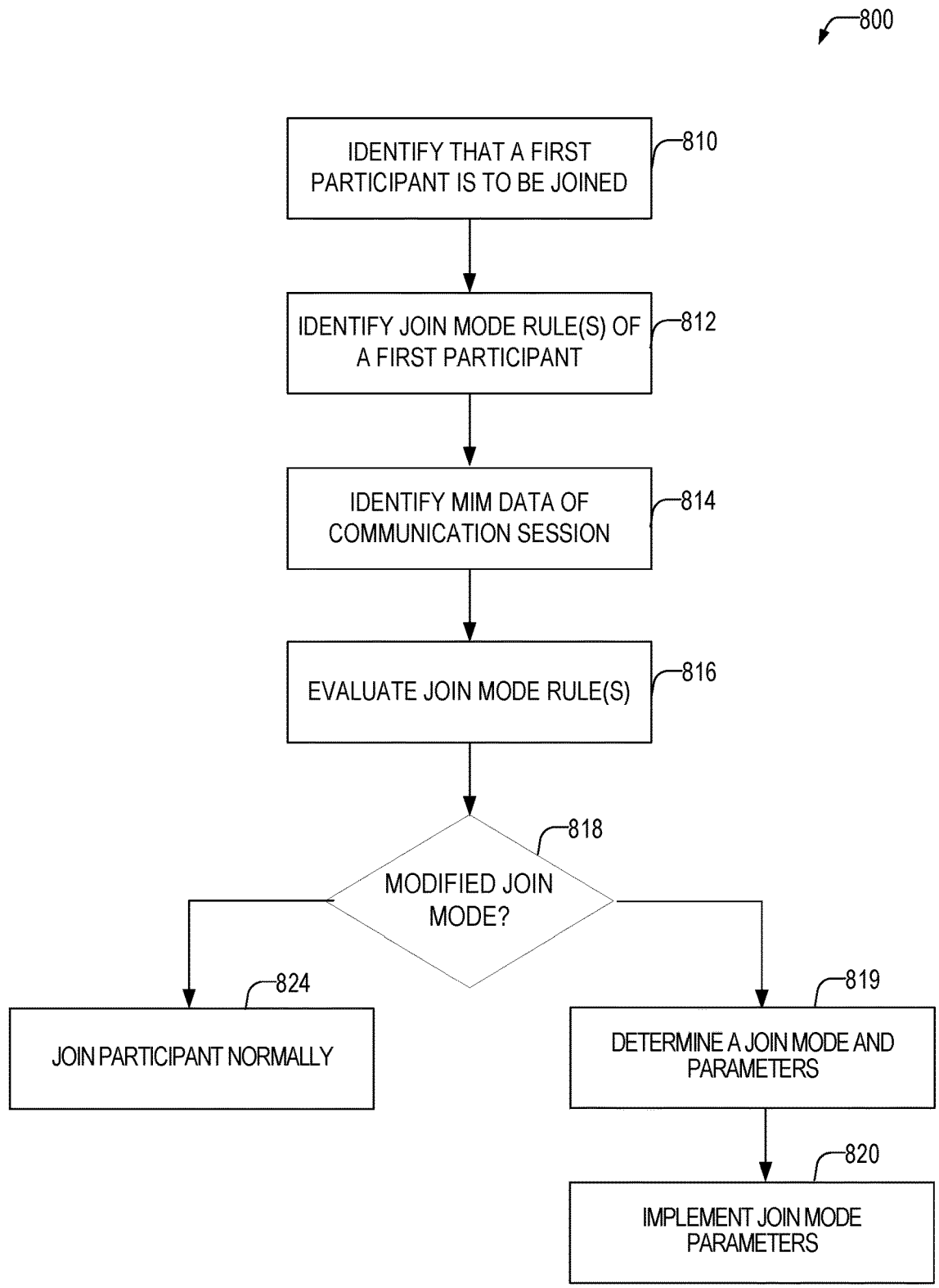
FIG. 8 illustrates a flowchart of a method for joining a communication session according to a join mode based upon one or more join mode rules according to some examples of the present disclosure.

FIG. 8 illustrates a flowchart of a method for joining a communication session according to a join mode based upon one or more join mode rules according to some examples of the present disclosure. FIG. 8 may be performed at a server of the communication service, at a participant's computing device, or partially at the server of the communication service and partially at the participant's computing device. At operation 810 the participant joins the communication session. For example, the participant may join automatically, such as using a method shown in FIG. 7 or may join manually.

At operation 812, the device identifies one or more join mode rules of the first participant. The join mode rules may be specified by the participant—e.g., through one or more GUIs or programmatically through an Application Programming Interface (API). In some examples the join mode rules may be specified by a communication service administrator. In other examples, the join mode rules may be specified by the meeting organizer. For example, the meeting organizer may specify that a particular participant is to be visible to a particular set of one or more other participants and not others. In still other examples, the join mode rules may be specified by one or more of the participant, administrator, and/or the meeting organizer. For example, some join mode rules may be specified by the participant, some by the administrator, and some by the meeting organizer.

At operation 814, the device may identify MIM data such as metadata and/or event data of the communication session that corresponds to the identified join-mode rules. Example meeting metadata include the title of the meeting, the invited participants, the responses of the invited participants (e.g., accept, tentative, decline), a description of the meeting (including any provided content and agendas), a time of the meeting, a duration of the meeting, and the like. Example meeting event data may include data and events that happen during the meeting such as topics discussed, content shared, participants that have joined, participants that have not joined, an elapsed duration of the meeting, a current presenter, and the like. If method 700 is performed by the participant's computing device, the participant's computing device and/or the communication service may communicate to obtain the meeting event data and/or meeting metadata. Metadata and/or meeting event data corresponds to the identified join mode rules if the metadata and/or meeting event data is needed to evaluate one or more identified join mode rules.

At operation 816, the device may evaluate the join mode rules using the metadata and/or the event data to determine whether the join mode rules indicate that the participant is to be joined in a modified join mode. Based upon the evaluation of the join rules at operation 816, the device determines, at operation 818, whether the participant is to be joined in a modified join mode.

If the participant is to be joined in a modified mode, then at operation 819, the particular join mode and its parameters may be identified. In some examples, the mode parameters may be identified in the join mode rules. In other examples, the join mode rules may select one of a plurality of join mode profiles that include the parameters. Join mode profiles may be prespecified or customized by a participant, administrator, meeting organizer, or the like. At operation 820, the device may implement, or cause to be implemented the join mode parameters identified in operation 819.

Example join mode parameters include whether the participant is visible or invisible to one or more other participants in the communication session; communication rules for communicating to and from the participant; rules for modifying the parameters (e.g., after a specified period of time); and the like. In some examples, the join mode parameters may be that the participant is hidden from one or more other participants. In some examples, a first participant is hidden from a second participant when one or more of the following conditions are met: the system precludes display of a participant tile (e.g., such as the grid of participant tiles 410, 510) of the first participant to the second participant; audio and/or video of the first participant is not delivered to the second participant; the first participant is not listed on a roster of attendees provided to the second participant; or the like. For preclusion of display of the participant tile, the system may not include a participant tile for the first participant or may replace the participant tile with an anonymized tile (e.g., with a generic avatar and name). In some examples, precluding delivery of audio and/or video of the first participant to the second participant may include not mixing audio and/or video of the first participant into the media sent to the second participant or the audio and/or video of the first participant may be filtered out or otherwise removed from the media sent to the second participant.

If method 800 is performed by the participant's computing device, the participant's computing device may send a message to the communication service identifying the join mode and parameters to implement the join mode parameters. In some examples, when the determined join mode conceals the first participant's presence from the second participant, implementing the join mode parameters may include precluding a display of a participant tile for the first participant on a participant interface of a computing device used by the second participant to display the real-time interactive communication session, while the joining of the first participant enables the computing device of the first participant to receive real-time media of the network-based real-time interactive communication session. If the method is performed at a server of the communication service, then the communication service sends a message to the client's computing device informing the device of the modified join mode.

If the evaluation of the join mode rules at operation 818 indicates that the participant is not to be joined in a modified join mode, the system may cause the participant to be joined normally where the participant is visible to all other participants and may communicate with all other participants at operation 824.

Figure 9:
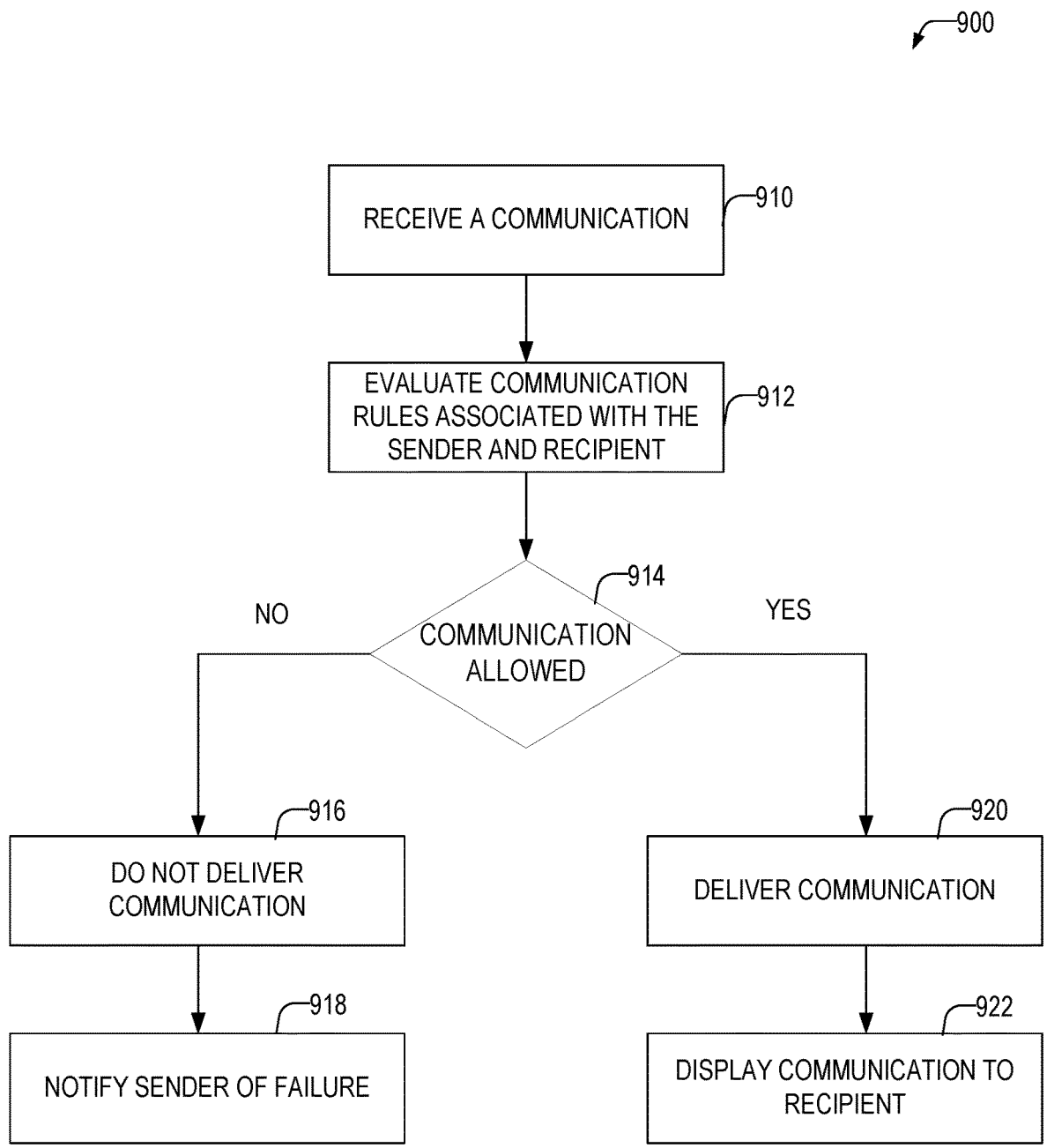
FIG. 9 illustrates a flowchart of communications through a modified join mode according to some examples of the present disclosure.

FIG. 9 illustrates a flowchart of communications through a modified join mode according to some examples of the present disclosure. Method 900 starts at operation 910 where a communication is received. The communication may be audio, video, text, files, or the like. At operation 912, the system may evaluate the communication rules associated with both the sender and recipient. In some examples, the communication rules may be join mode parameters. In other examples, the communication rules may be stand-alone rules. In some examples, the communication rules may factor in how a particular participant was joined (whether they automatically joined, or manually joined); whether the sender and/or recipient are visible to each other; the type of communication; the communication length; the content of the communications and the like. For rules related to content of the communication the system may convert audio and/or video to textual descriptions of the content to compare against the specified rules. For example, the participant may wish to receive communications only on certain topics. Audio and/or video may be transcribed and one or more Natural Language Processing algorithms such as a Generative AI algorithm (e.g., such as a Generative Pretrained Transformer (GPT)) may be used to determine the topic of the communication.

If at operation 914, the communication is allowed, then at operation 920 the communication may be delivered to the recipient. At operation 922, the communication may be caused to be displayed to the recipient. In some examples, operations 914 and 922 may be a same operation—e.g., by virtue of the delivery of the communication, the communication is displayed or otherwise played back.

If at operation 914, the communication is not allowed, then at operation 916, the communication is not delivered. In some examples, operation 916 may involve creating different audio and/or video mixes for different groups of participants. For example, if a first participant is hidden from a second participant, but not a third participant, a mix of all participant's audio and/or video (including the first participant) may be delivered to the third participant, but a different mix of participant's audio and/or video that omits the first participant's audio and/or video may be delivered to the second participant. In other examples, the first participant's audio and/or video may be filtered out before delivery to the second participant. In some examples, at operation 918, the sender may be notified of the failure of the message.

Figure 10:
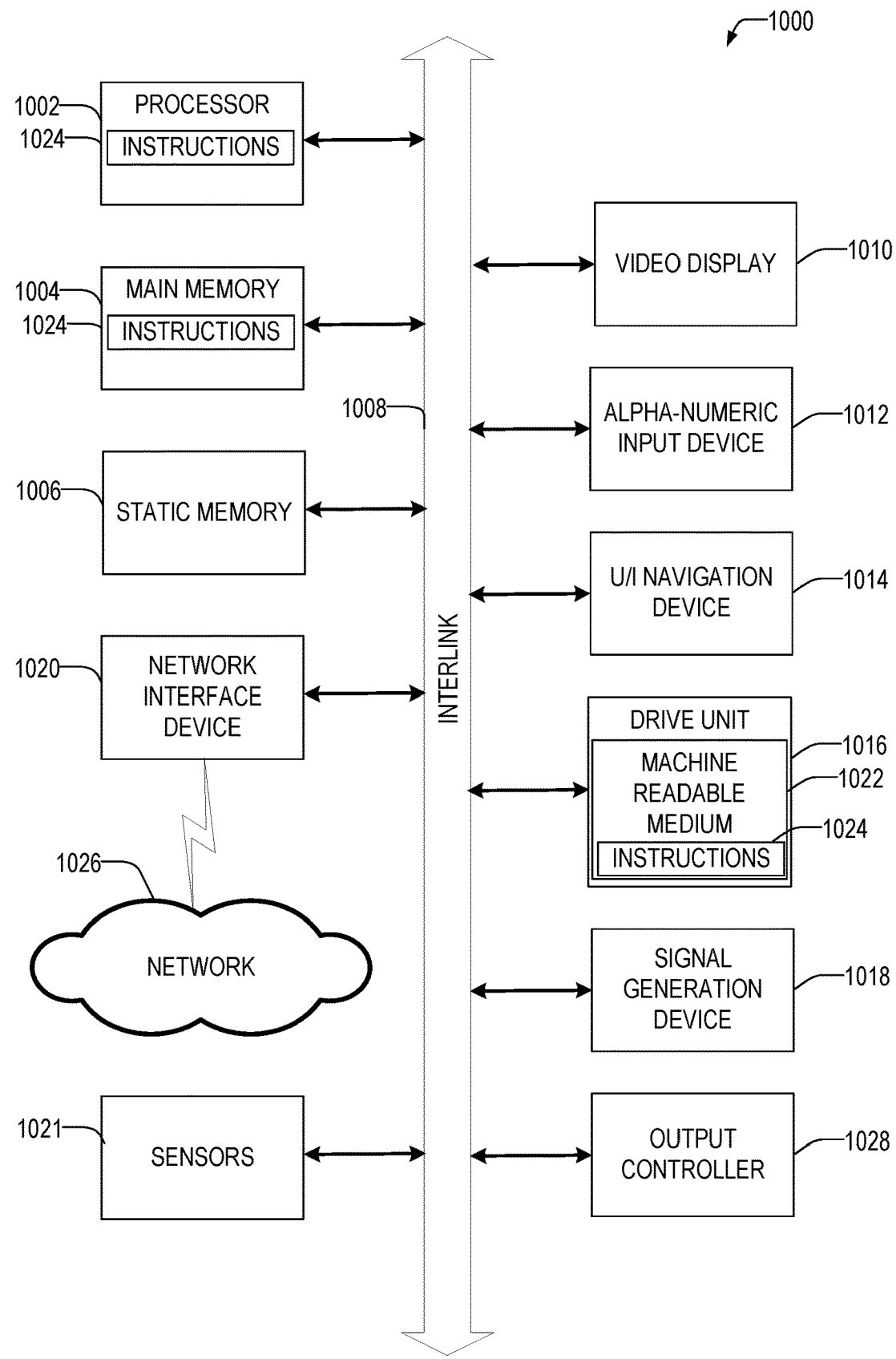
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may be performed. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be in the form of a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 1000 may implement any of the devices of FIG. 1, one or more of the components in the MSDs of FIGS. 2 and 3, provide the GUIs of FIGS. 4-6; and implement the methods of FIGS. 7-9.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 1000 may include one or more hardware processors, such as processor 1002. Processor 1002 may be a central processing unit (CPU), a graphics processing unit (GPU), a hardware processor core, or any combination thereof. Machine 1000 may include a main memory 1004 and a static memory 1006, some or all of which may communicate with each other via an interlink (e.g., bus) 1008. Examples of main memory 1004 may include Synchronous Dynamic Random-Access Memory (SDRAM), such as Double Data Rate memory, such as DDR4 or DDR5. Interlink 1008 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 1000 may further include a display unit 1010, an alphanumeric input device 1012 (e.g., a keyboard), and a participant interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The Machine 1000 may communicate with one or more other machines wired or wirelessly utilizing any one of a number of transfer protocols (e.g., frame relay, internet protocol (IP), transmission control protocol (TCP), participant datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple Participant MIMO techniques.

Other Notes and Examples

Example 1 is a method for modifying a network-based real-time interactive communication session, the method comprising: using one or more hardware processors: identifying that a first participant of a network-based real-time interactive communication session is to be joined to the network-based real-time interactive communication session; identifying a join mode rule associated with the first participant of the network-based real-time interactive communication session; identifying metadata about the network-based real-time interactive communication session or status information describing a current status of an ongoing network-based real-time interactive communication session; determining a join mode for the first participant based on evaluating the join mode rule using the metadata or status information, wherein the determined join mode comprises an indication that the first participant is to be hidden from a second participant of the network-based real-time interactive communication session; causing the first participant to be joined to the network-based real-time interactive communication session according to the determined join mode, wherein the determined join mode conceals the first participant's presence from the second participant by precluding a display of a participant tile for the first participant on a user interface of a computing device used by the second participant to display the network-based real-time interactive communication session, while the joining of the first participant enables the computing device of the first participant to receive real-time media of the network-based real-time interactive communication session.

In Example 2, the subject matter of Example 1 includes, identifying, based upon the join mode, that a third participant that can see the first participant's presence; determining a second rule associated with the first participant, the second rule specifying a type of communication allowed between the first participant and the third participant based upon the join mode; receiving a communication from the third participant addressed to the first participant; determining whether the communication is allowed based on evaluating the communication and the second rule; and responsive to determining the communication is allowed, transmitting the communication to the first participant.

In Example 3, the subject matter of Example 2 includes, wherein the second rule comprises one or more of: a maximum message size for communications from the third participant to the first participant; allowable communication mediums between the first participant and the third participant; time-based access controls for when communications can be sent between the first participant and the third participant; a maximum frequency for sending communications between the first participant and the third participant during a defined time period; content filtering to be applied to communications between the first participant and the third participant; a permission setting indicating whether permission is required from the first participant before allowing a communication channel to open with the third participant.

In Example 4, the subject matter of Examples 1-3 includes, displaying, to the first participant, identifiers of one or more participants, including the second participant, that cannot see the presence of the first participant in the network-based real-time interactive communication session based on the join mode; receiving input from the first participant indicating selection of the second participant from the displayed identifiers; updating the join mode to unhide the first participant from the second participant; and causing display of a participant tile indicating the first participant's presence to the second participant based on the updated join mode.

In Example 5, the subject matter of Examples 1~4 includes, prior to identifying that the first participant of the network-based real-time interactive communication session is to be joined to the network-based real-time interactive communication session: identifying an automatic join rule associated with a first participant, the automatic join rule specifying one or more conditions that cause the first participant to be automatically joined to the network-based real-time interactive communication session; evaluating the automatic join rule using the metadata about the network-based real-time interactive communication session or the status information to determine whether the one or more conditions have been satisfied to automatically join the first participant to the network-based real-time interactive communication session; and wherein the identifying that the first participant of the network-based real-time interactive communication session is to be joined to the network-based real-time interactive communication session comprises determining that the evaluation of the automatic join rule indicates that the first participant is to be automatically joined.

In Example 6, the subject matter of Example 5 includes, wherein the metadata about the network-based real-time interactive communication session or the status information comprises: discussion of a predefined topic in the communication session; whether one or more other invited participants have joined; determining whether media of the communication session includes a mention of the first participant; or determining that one or more items of content have been shared.

In Example 7, the subject matter of Examples 1-6 includes, causing display of messages sent from the first participant to be posted as coming from an anonymous participant at a device of the second participant.

In Example 8, the subject matter of Examples 1-7 includes, determining whether the first participant has been joined to the communication session in the determined join mode for longer than a threshold period of time; and responsive to determining that the threshold period of time has been exceeded, updating the join mode to reveal the presence of the first participant to the second participant in the communication session by causing a display of the participant tile for the first participant on the user interface of a computing device used by the second participant to display the network-based real-time interactive communication session.

In Example 9, the subject matter of Examples 1-8 includes, accessing a second join mode rule associated with the first participant that automatically shows the first participant to the second participant upon satisfaction of a condition; and determining that the condition is satisfied, and in response, revealing the first participant to the second participant by causing a display of the participant tile for the first participant on the user interface of a computing device used by the second participant to display the network-based real-time interactive communication session.

In Example 10, the subject matter of Examples 1-9 includes, prior to joining the first participant in the determined join mode, accessing settings of the network-based communication session indicating restrictions or permissions for join modes; determining whether the settings indicate that the determined join mode is permitted for the network-based communication session; and wherein joining the first participant in the determined join mode comprises joining the first participant responsive to determining that the settings indicate permission for joining in the determined join mode.

In Example 11, the subject matter of Examples 1-10 includes, receiving an indication from the first participant to unmute themselves or to show video of themselves; and responsive to receiving the indication, causing the first participant to be visible to the second participant by causing a display of the participant tile for the first participant on the user interface of a computing device used by the second participant to display the network-based real-time interactive communication session.

In Example 12, the subject matter of Examples 1-11 includes, providing an indicator to a third participant that the first participant is not visible to the second participant.

Example 13 is a computing device for modifying a network-based real-time interactive communication session, the computing device comprising: a hardware processor; a memory, the memory storing instructions, which when executed by the hardware processor, causes the computing device to perform operations comprising: identifying that a first participant of a network-based real-time interactive communication session is to be joined to the network-based real-time interactive communication session; identifying a join mode rule associated with the first participant of the network-based real-time interactive communication session; identifying metadata about the network-based real-time interactive communication session or status information describing a current status of an ongoing network-based real-time interactive communication session; determining a join mode for the first participant based on evaluating the join mode rule using the metadata or status information, wherein the determined join mode comprises an indication that the first participant is to be hidden from a second participant of the network-based real-time interactive communication session; causing the first participant to be joined to the network-based real-time interactive communication session according to the determined join mode, wherein the determined join mode conceals the first participant's presence from the second participant by precluding a display of a participant tile for the first participant on a user interface of a computing device used by the second participant to display the network-based real-time interactive communication session, while the joining of the first participant enables the computing device of the first participant to receive real-time media of the network-based real-time interactive communication session.

In Example 14, the subject matter of Example 13 includes, wherein the operations further comprise: identifying, based upon the join mode, that a third participant that can see the first participant's presence; determining a second rule associated with the first participant, the second rule specifying a type of communication allowed between the first participant and the third participant based upon the join mode; receiving a communication from the third participant addressed to the first participant; determining whether the communication is allowed based on evaluating the communication and the second rule; and responsive to determining the communication is allowed, transmitting the communication to the first participant.

In Example 15, the subject matter of Example 14 includes, wherein the second rule comprises one or more of: a maximum message size for communications from the third participant to the first participant; allowable communication mediums between the first participant and the third participant; time-based access controls for when communications can be sent between the first participant and the third participant; a maximum frequency for sending communications between the first participant and the third participant during a defined time period; content filtering to be applied to communications between the first participant and the third participant; a permission setting indicating whether permission is required from the first participant before allowing a communication channel to open with the third participant.

In Example 16, the subject matter of Examples 13-15 includes, wherein the operations further comprise: displaying, to the first participant, identifiers of one or more participants, including the second participant, that cannot see the presence of the first participant in the network-based real-time interactive communication session based on the join mode; receiving input from the first participant indicating selection of the second participant from the displayed identifiers; updating the join mode to unhide the first participant from the second participant; and causing display of a participant tile indicating the first participant's presence to the second participant based on the updated join mode.

In Example 17, the subject matter of Examples 13-16 includes, wherein the operations further comprise: prior to identifying that the first participant of the network-based real-time interactive communication session is to be joined to the network-based real-time interactive communication session: identifying an automatic join rule associated with a first participant, the automatic join rule specifying one or more conditions that cause the first participant to be automatically joined to the network-based real-time interactive communication session; evaluating the automatic join rule using the metadata about the network-based real-time interactive communication session or the status information to determine whether the one or more conditions have been satisfied to automatically join the first participant to the network-based real-time interactive communication session; and wherein the identifying that the first participant of the network-based real-time interactive communication session is to be joined to the network-based real-time interactive communication session comprises determining that the evaluation of the automatic join rule indicates that the first participant is to be automatically joined.

In Example 18, the subject matter of Example 17 includes, wherein the metadata about the network-based real-time interactive communication session or the status information comprises: discussion of a predefined topic in the communication session; whether one or more other invited participants have joined; determining whether media of the communication session includes a mention of the first participant; or determining that one or more items of content have been shared.

In Example 19, the subject matter of Examples 13-18 includes, wherein the operations further comprise: causing display of messages sent from the first participant to be posted as coming from an anonymous participant at a device of the second participant.

In Example 20, the subject matter of Examples 13-19 includes, wherein the operations further comprise: determining whether the first participant has been joined to the communication session in the determined join mode for longer than a threshold period of time; and responsive to determining that the threshold period of time has been exceeded, updating the join mode to reveal the presence of the first participant to the second participant in the communication session by causing a display of the participant tile for the first participant on the user interface of a computing device used by the second participant to display the network-based real-time interactive communication session.

In Example 21, the subject matter of Examples 13-20 includes, wherein the operations further comprise: accessing a second join mode rule associated with the first participant that automatically shows the first participant to the second participant upon satisfaction of a condition; and determining that the condition is satisfied, and in response, revealing the first participant to the second participant by causing a display of the participant tile for the first participant on the user interface of a computing device used by the second participant to display the network-based real-time interactive communication session.

In Example 22, the subject matter of Examples 13-21 includes, wherein the operations further comprise: prior to joining the first participant in the determined join mode, accessing settings of the network-based communication session indicating restrictions or permissions for join modes; determining whether the settings indicate that the determined join mode is permitted for the network-based communication session; and wherein joining the first participant in the determined join mode comprises joining the first participant responsive to determining that the settings indicate permission for joining in the determined join mode.

In Example 23, the subject matter of Examples 13-22 includes, wherein the operations further comprise: receiving an indication from the first participant to unmute themselves or to show video of themselves; and responsive to receiving the indication, causing the first participant to be visible to the second participant by causing a display of the participant tile for the first participant on the user interface of a computing device used by the second participant to display the network-based real-time interactive communication session.

In Example 24, the subject matter of Examples 13-23 includes, wherein the operations further comprise: providing an indicator to a third participant that the first participant is not visible to the second participant.

Example 25 is a machine-readable medium, storing instructions for modifying a network-based real-time interactive communication session, the instructions, when executed by a computing device, cause the computing device to perform operations comprising: identifying that a first participant of a network-based real-time interactive communication session is to be joined to the network-based real-time interactive communication session; identifying a join mode rule associated with the first participant of the network-based real-time interactive communication session; identifying metadata about the network-based real-time interactive communication session or status information describing a current status of an ongoing network-based real-time interactive communication session; determining a join mode for the first participant based on evaluating the join mode rule using the metadata or status information, wherein the determined join mode comprises an indication that the first participant is to be hidden from a second participant of the network-based real-time interactive communication session; causing the first participant to be joined to the network-based real-time interactive communication session according to the determined join mode, wherein the determined join mode conceals the first participant's presence from the second participant by precluding a display of a participant tile for the first participant on a user interface of a computing device used by the second participant to display the network-based real-time interactive communication session, while the joining of the first participant enables the computing device of the first participant to receive real-time media of the network-based real-time interactive communication session.

In Example 26, the subject matter of Example 25 includes, wherein the operations further comprise: identifying, based upon the join mode, that a third participant that can see the first participant's presence; determining a second rule associated with the first participant, the second rule specifying a type of communication allowed between the first participant and the third participant based upon the join mode; receiving a communication from the third participant addressed to the first participant; determining whether the communication is allowed based on evaluating the communication and the second rule; and responsive to determining the communication is allowed, transmitting the communication to the first participant.

In Example 27, the subject matter of Example 26 includes, wherein the second rule comprises one or more of: a maximum message size for communications from the third participant to the first participant; allowable communication mediums between the first participant and the third participant; time-based access controls for when communications can be sent between the first participant and the third participant; a maximum frequency for sending communications between the first participant and the third participant during a defined time period; content filtering to be applied to communications between the first participant and the third participant; a permission setting indicating whether permission is required from the first participant before allowing a communication channel to open with the third participant.

In Example 28, the subject matter of Examples 25-27 includes, wherein the operations further comprise: displaying, to the first participant, identifiers of one or more participants, including the second participant, that cannot see the presence of the first participant in the network-based real-time interactive communication session based on the join mode; receiving input from the first participant indicating selection of the second participant from the displayed identifiers; updating the join mode to unhide the first participant from the second participant; and causing display of a participant tile indicating the first participant's presence to the second participant based on the updated join mode.

In Example 29, the subject matter of Examples 25-28 includes, wherein the operations further comprise: prior to identifying that the first participant of the network-based real-time interactive communication session is to be joined to the network-based real-time interactive communication session: identifying an automatic join rule associated with a first participant, the automatic join rule specifying one or more conditions that cause the first participant to be automatically joined to the network-based real-time interactive communication session; evaluating the automatic join rule using the metadata about the network-based real-time interactive communication session or the status information to determine whether the one or more conditions have been satisfied to automatically join the first participant to the network-based real-time interactive communication session; and wherein the identifying that the first participant of the network-based real-time interactive communication session is to be joined to the network-based real-time interactive communication session comprises determining that the evaluation of the automatic join rule indicates that the first participant is to be automatically joined.

In Example 30, the subject matter of Example 29 includes, wherein the metadata about the network-based real-time interactive communication session or the status information comprises: discussion of a predefined topic in the communication session; whether one or more other invited participants have joined; determining whether media of the communication session includes a mention of the first participant; or determining that one or more items of content have been shared.

In Example 31, the subject matter of Examples 25-30 includes, wherein the operations further comprise: causing display of messages sent from the first participant to be posted as coming from an anonymous participant at a device of the second participant.

In Example 32, the subject matter of Examples 25-31 includes, wherein the operations further comprise: determining whether the first participant has been joined to the communication session in the determined join mode for longer than a threshold period of time; and responsive to determining that the threshold period of time has been exceeded, updating the join mode to reveal the presence of the first participant to the second participant in the communication session by causing a display of the participant tile for the first participant on the user interface of a computing device used by the second participant to display the network-based real-time interactive communication session.

In Example 33, the subject matter of Examples 25-32 includes, wherein the operations further comprise: accessing a second join mode rule associated with the first participant that automatically shows the first participant to the second participant upon satisfaction of a condition; and determining that the condition is satisfied, and in response, revealing the first participant to the second participant by causing a display of the participant tile for the first participant on the user interface of a computing device used by the second participant to display the network-based real-time interactive communication session.

In Example 34, the subject matter of Examples 25-33 includes, wherein the operations further comprise: prior to joining the first participant in the determined join mode, accessing settings of the network-based communication session indicating restrictions or permissions for join modes; determining whether the settings indicate that the determined join mode is permitted for the network-based communication session; and wherein joining the first participant in the determined join mode comprises joining the first participant responsive to determining that the settings indicate permission for joining in the determined join mode.

In Example 35, the subject matter of Examples 25-34 includes, wherein the operations further comprise: receiving an indication from the first participant to unmute themselves or to show video of themselves; and responsive to receiving the indication, causing the first participant to be visible to the second participant by causing a display of the participant tile for the first participant on the user interface of a computing device used by the second participant to display the network-based real-time interactive communication session.

In Example 36, the subject matter of Examples 25-35 includes, wherein the operations further comprise: providing an indicator to a third participant that the first participant is not visible to the second participant.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36. Example 39 is a system to implement of any of Examples 1-36.

Example 40 is a method to implement of any of Examples 1-36.

What is claimed is:

1. A method for modifying a network-based real-time interactive communication session, the method comprising:
using one or more hardware processors:
identifying that a first participant of a network-based real-time interactive communication session is to be joined to the network-based real-time interactive communication session;
identifying a join mode rule created by the first participant of the network-based real-time interactive communication session;
identifying metadata about the network-based real-time interactive communication session or status information describing a current status of an ongoing network-based real-time interactive communication session;
determining a join mode for the first participant based on evaluating the join mode rule using the metadata or status information, wherein the determined join mode comprises an indication that the first participant is to be hidden from a second participant of the network-based real-time interactive communication session; and
causing the first participant to be joined to the network-based real-time interactive communication session according to the determined join mode, wherein the determined join mode conceals the first participant's presence from the second participant by precluding a display of a participant tile for the first participant on a user interface of a computing device used by the second participant to display the network-based real-time interactive communication session, while the joining of the first participant enables the computing device of the first participant to receive real-time media of the network-based real-time interactive communication session.

2. The method of claim 1, further comprising:
identifying, based upon the join mode, that a third participant that can see the first participant's presence;
determining a second rule associated with the first participant, the second rule specifying a type of communication allowed between the first participant and the third participant based upon the join mode;
receiving a communication from the third participant addressed to the first participant;
determining whether the communication is allowed based on evaluating the communication and the second rule; and
responsive to determining the communication is allowed, transmitting the communication to the first participant.

3. The method of claim 2, wherein the second rule comprises one or more of:
a maximum message size for communications from the third participant to the first participant;
allowable communication mediums between the first participant and the third participant;
time-based access controls for when communications can be sent between the first participant and the third participant;
a maximum frequency for sending communications between the first participant and the third participant during a defined time period;
content filtering to be applied to communications between the first participant and the third participant; and
a permission setting indicating whether permission is required from the first participant before allowing a communication channel to open with the third participant.

4. The method of claim 1, further comprising:
displaying, to the first participant and during the network-based real-time interactive communication session, identifiers of one or more participants, including the second participant, that cannot see the presence of the first participant in the network-based real-time interactive communication session based on the join mode;
receiving input from the first participant indicating selection of the second participant from the displayed identifiers;
updating the join mode to unhide the first participant from the second participant; and causing display of a participant tile indicating the first participant's presence to the second participant based on the updated join mode.

5. The method of claim 1, further comprising:
prior to identifying that the first participant of the network-based real-time interactive communication session is to be joined to the network-based real-time interactive communication session:
identifying an automatic join rule associated with a first participant, the automatic join rule specifying one or more conditions that cause the first participant to be automatically joined to the network-based real-time interactive communication session;
evaluating the automatic join rule using the metadata about the network-based real-time interactive communication session or the status information to determine whether the one or more conditions have been satisfied to automatically join the first participant to the network-based real-time interactive communication session; and
wherein the identifying that the first participant of the network-based real-time interactive communication session is to be joined to the network-based real-time interactive communication session comprises determining that the evaluation of the automatic join rule indicates that the first participant is to be automatically joined.

6. The method of claim 5, wherein the metadata about the network-based real-time interactive communication session or the status information comprises:
discussion of a predefined topic in the communication session;
whether one or more other invited participants have joined;
determining whether media of the communication session includes a mention of the first participant; or
determining that one or more items of content have been shared.

7. The method of claim 1, further comprising:
causing display of messages sent from the first participant to be posted as coming from an anonymous participant at a device of the second participant.

8. The method of claim 1, further comprising:
determining whether the first participant has been joined to the communication session in the determined join mode for longer than a threshold period of time; and
responsive to determining that the threshold period of time has been exceeded, updating the join mode to reveal the presence of the first participant to the second participant in the communication session by causing a display of the participant tile for the first participant on the user interface of a computing device used by the second participant to display the network-based real-time interactive communication session.

9. The method of claim 1, further comprising:
accessing a second join mode rule associated with the first participant that automatically shows the first participant to the second participant upon satisfaction of a condition; and
determining that the condition is satisfied, and in response, revealing the first participant to the second participant by causing a display of the participant tile for the first participant on the user interface of a computing device used by the second participant to display the network-based real-time interactive communication session.

10. The method of claim 1, further comprising:
prior to joining the first participant in the determined join mode, accessing settings of the network-based communication session indicating restrictions or permissions for join modes;
determining whether the settings indicate that the determined join mode is permitted for the network-based communication session; and
wherein joining the first participant in the determined join mode comprises joining the first participant responsive to determining that the settings indicate permission for joining in the determined join mode.

11. The method of claim 1, further comprising:
receiving an indication from the first participant to unmute themselves or to show video of themselves; and
responsive to receiving the indication, causing the first participant to be visible to the second participant by causing a display of the participant tile for the first participant on the user interface of a computing device used by the second participant to display the network-based real-time interactive communication session.

12. The method of claim 1, further comprising:
providing an indicator to a third participant that the first participant is not visible to the second participant.

13. A computing device for modifying a network-based real-time interactive communication session, the computing device comprising:
a hardware processor;
a memory, the memory storing instructions, which when executed by the hardware processor, causes the computing device to perform operations comprising:
identifying that a first participant of a network-based real-time interactive communication session is to be joined to the network-based real-time interactive communication session;
identifying a join mode rule created by the first participant of the network-based real-time interactive communication session;
identifying metadata about the network-based real-time interactive communication session or status information describing a current status of an ongoing network-based real-time interactive communication session;
determining a join mode for the first participant based on evaluating the join mode rule using the metadata or status information, wherein the determined join mode comprises an indication that the first participant is to be hidden from a second participant of the network-based real-time interactive communication session; and
causing the first participant to be joined to the network-based real-time interactive communication session according to the determined join mode, wherein the determined join mode conceals the first participant's presence from the second participant by precluding a display of a participant tile for the first participant on a user interface of a computing device used by the second participant to display the network-based real-time interactive communication session, while the joining of the first participant enables the computing device of the first participant to receive real-time media of the network-based real-time interactive communication session.

14. The computing device of claim 13, wherein the operations further comprise:
prior to identifying that the first participant of the network-based real-time interactive communication session is to be joined to the network-based real-time interactive communication session:

identifying an automatic join rule associated with a first participant, the automatic join rule specifying one or more conditions that cause the first participant to be automatically joined to the network-based real-time interactive communication session;

evaluating the automatic join rule using the metadata about the network-based real-time interactive communication session or the status information to determine whether the one or more conditions have been satisfied to automatically join the first participant to the network-based real-time interactive communication session; and wherein the identifying that the first participant of the network-based real-time interactive communication session is to be joined to the network-based real-time interactive communication session comprises determining that the evaluation of the automatic join rule indicates that the first participant is to be automatically joined.

15. The computing device of claim 14, wherein the metadata about the network-based real-time interactive communication session or the status information comprises:

discussion of a predefined topic in the communication session;

whether one or more other invited participants have joined;

determining whether media of the communication session includes a mention of the first participant; or determining that one or more items of content have been shared.

16. The computing device of claim 13, wherein the operations further comprise:

determining whether the first participant has been joined to the communication session in the determined join mode for longer than a threshold period of time; and responsive to determining that the threshold period of time has been exceeded, updating the join mode to reveal the presence of the first participant to the second participant in the communication session by causing a display of the participant tile for the first participant on the user interface of a computing device used by the second participant to display the network-based real-time interactive communication session.

17. The computing device of claim 13, wherein the operations further comprise:

accessing a second join mode rule associated with the first participant that automatically shows the first participant to the second participant upon satisfaction of a condition; and determining that the condition is satisfied, and in response, revealing the first participant to the second participant by causing a display of the participant tile for the first participant on the user interface of a computing device used by the second participant to display the network-based real-time interactive communication session.

18. A machine-readable medium, storing instructions for modifying a network-based real-time interactive communication session, the instructions, when executed by a computing device, cause the computing device to perform operations comprising:

identifying that a first participant of a network-based real-time interactive communication session is to be joined to the network-based real-time interactive communication session;

identifying a join mode rule created by the first participant of the network-based real-time interactive communication session;

identifying metadata about the network-based real-time interactive communication session or status information describing a current status of an ongoing network-based real-time interactive communication session;

determining a join mode for the first participant based on evaluating the join mode rule using the metadata or status information, wherein the determined join mode comprises an indication that the first participant is to be hidden from a second participant of the network-based real-time interactive communication session; and causing the first participant to be joined to the network-based real-time interactive communication session according to the determined join mode, wherein the determined join mode conceals the first participant's presence from the second participant by precluding a display of a participant tile for the first participant on a user interface of a computing device used by the second participant to display the network-based real-time interactive communication session, while the joining of the first participant enables the computing device of the first participant to receive real-time media of the network-based real-time interactive communication session.

19. The machine-readable medium of claim 18, wherein the operations further comprise:

prior to identifying that the first participant of the network-based real-time interactive communication session is to be joined to the network-based real-time interactive communication session:

identifying an automatic join rule associated with a first participant, the automatic join rule specifying one or more conditions that cause the first participant to be automatically joined to the network-based real-time interactive communication session;

evaluating the automatic join rule using the metadata about the network-based real-time interactive communication session or the status information to determine whether the one or more conditions have been satisfied to automatically join the first participant to the network-based real-time interactive communication session; and wherein the identifying that the first participant of the network-based real-time interactive communication session is to be joined to the network-based real-time interactive communication session comprises determining that the evaluation of the automatic join rule indicates that the first participant is to be automatically joined.

20. The machine-readable medium of claim 19, wherein the metadata about the network-based real-time interactive communication session or the status information comprises:

discussion of a predefined topic in the communication session;

whether one or more other invited participants have joined;

determining whether media of the communication session includes a mention of the first participant; or determining that one or more items of content have been shared.

* * * * *